(12) United States Patent
Dalal et al.

(10) Patent No.: US 8,095,482 B2
(45) Date of Patent: Jan. 10, 2012

(54) SYSTEM AND METHOD TO LEARN AND DEPLOY AN OPTIMAL USER EXPERIENCE IN AN ONLINE SYSTEM

(75) Inventors: Vipul C. Dalal, Sunnyvale, CA (US); Jing Chen, Milpitas, CA (US); Suhail Ansari, Sunnyvale, CA (US); James Ladd, San Jose, CA (US)

(73) Assignee: eBay Inc., San Jose, CA (US)

( * ) Notice: Subject to any disclaimer, the term of this patent is extended or adjusted under 35 U.S.C. 154(b) by 635 days.

(21) Appl. No.: 12/261,952

(22) Filed: Oct. 30, 2008

(65) Prior Publication Data

US 2009/0307161 A1 Dec. 10, 2009

Related U.S. Application Data

(60) Provisional application No. 61/059,192, filed on Jun. 5, 2008.

(51) Int. Cl.
*G06F 15/18* (2006.01)

(52) U.S. Cl. ...................................................... 706/12
(58) Field of Classification Search .................. None
See application file for complete search history.

(56) References Cited

U.S. PATENT DOCUMENTS 6,564,170 B2 * 5/2003 Halabieh ........................ 702/181
7,203,909 B1 * 4/2007 Horvitz et al. ................ 715/765

* cited by examiner

*Primary Examiner* — Michael B. Holmes
*Assistant Examiner* — Paulinho E Smith
(74) *Attorney, Agent, or Firm* — Schwegman, Lundberg & Woessner, P.A.

(57) ABSTRACT

Methods and systems to learn an optimal user experience. The system receives a request over a network from a user. The request includes context information. The system identifies a response to the request is to be utilized to learn whether a first interface component included in a first plurality of interface components is an optimal choice for a first decision. The response includes an interface. The interface includes the first interface component. The system identifies the response to the request is to be utilized based on the context information. Finally, the system communicates the response over the network to the user.

24 Claims, 11 Drawing Sheets

SCENARIO 1 — 280

HP => DLP => AMI => AMI => VIEW => BID — 282
    M1    M3   M3
    M2    M4   M4

| USER FEEDBACK INFORMATION 222 ||||||||| |
|---|---|---|---|---|---|---|---|---|
| INPUT DIMENSIONS 250 | OUTPUT DIMENSIONS 260 | IMPRESSION COUNT 310 | SELECT COUNT 312 | VIEW COUNT 314 | BID COUNT 316 | PURHASE COUNT 318 | WATCH COUNT 320 | SCORE 322 |
| 0, SEG1, , "LCD" | DLP | 1 | 1 | 1 | 1 | 0 | 0 | 1 |
| 0, SEG1, , "LCD" | DLP, M1 | 1 | 0 | 0 | 0 | 0 | 0 | 0 |
| 0, SEG1, , "LCD" | DLP, M2 | 1 | 1 | 1 | 1 | 0 | 0 | 1 |
| 0, SEG1,CE , "LCD" | AMI | 2 | 2 | 1 | 1 | 0 | 0 | 1 |
| 0, SEG1,CE , "LCD" | AMI, M3 | 2 | 1 | 1 | 1 | 0 | 0 | 0.5 |
| 0, SEG1,CE , "LCD" | AMI, M3, V-LV | 2 | 1 | 1 | 1 | 0 | 0 | 0.5 |
| 0, SEG1,CE , "LCD" | AMI, M3, S-BM1 | 2 | 1 | 1 | 1 | 0 | 0 | 0.5 |
| 0, SEG1,CE , "LCD" | AMI, M3, I-50 | 2 | 1 | 1 | 1 | 0 | 0 | 0.5 |
| 0, SEG1,CE , "LCD" | AMI, M4 | 2 | 1 | 1 | 1 | 0 | 0 | 0.5 |

FIG.4A

SCENARIO 2 — 350

HP => DLP => AMI => AMI => AMI => VIEW => BID, PURCHASE — 352
    M1    M3   M3   M3
    M2    M4   M4   M4

| USER FEEDBACK INFORMATION 222 ||||||||| |
|---|---|---|---|---|---|---|---|---|
| INPUT DIMENSIONS 250 | OUTPUT DIMENSIONS 260 | IMPRESSION COUNT 310 | SELECT COUNT 312 | VIEW COUNT 314 | BID COUNT 316 | PURHASE COUNT 318 | WATCH COUNT 320 | SCORE 322 |
| 0, SEG2, , "LCD" | DLP | 1 | 1 | 5 | 1 | 1 | 0 | 2 |
| 0, SEG2, , "LCD" | DLP, M1 | 1 | 0 | 0 | 0 | 0 | 0 | 0 |
| 0, SEG2, , "LCD" | DLP, M2 | 1 | 1 | 5 | 1 | 1 | 0 | 2 |
| 0, SEG2,CN , "LCD" | AMI | 3 | 3 | 5 | 1 | 1 | 0 | 2 |
| 0, SEG2,CN , "LCD" | AMI, M3 | 3 | 2 | 5 | 1 | 1 | 0 | 4/3 |
| 0, SEG2,CN , "LCD" | AMI, M3, V-GV | 3 | 2 | 5 | 1 | 1 | 0 | 4/3 |
| 0, SEG2,CN , "LCD" | AMI, M3, S-BM4 | 3 | 2 | 5 | 1 | 1 | 0 | 4/3 |
| 0, SEG2,CN , "LCD" | AMI, M3, I-48 | 3 | 2 | 5 | 1 | 1 | 0 | 4/3 |
| 0, SEG2,CN , "LCD" | AMI, M4 | 3 | 1 | 5 | 1 | 1 | 0 | 2/3 |

FIG.4B

SCENARIO 3 / 370

HP => DLP => AMI => AMI => VIEW => WATCH, PURCHASE / 372
    M1   M3   M3
    M2   M4   M4

| USER FEEDBACK INFORMATION 222 | | | | | | | | |
|---|---|---|---|---|---|---|---|---|
| INPUT DIMENSIONS 250 | OUTPUT DIMENSIONS 260 | IMPRESSION COUNT 310 | SELECT COUNT 312 | VIEW COUNT 314 | BID COUNT 316 | PURHASE COUNT 318 | WATCH COUNT 320 | SCORE 322 |
| 0, SEG1, , "LCD" | DLP | 1 | 1 | 3 | 0 | 1 | 1 | 2 |
| 0, SEG1, , "LCD" | DLP, M1 | 1 | 0 | 0 | 0 | 0 | 0 | 0 |
| 0, SEG1, , "LCD" | DLP, M2 | 1 | 1 | 3 | 0 | 1 | 1 | 2 |
| 0, SEG1,CE , "LCD" | AMI | 1 | 1 | 3 | 0 | 1 | 1 | 2 |
| 0, SEG1,CE , "LCD" | AMI, M3 | 1 | 0 | 0 | 0 | 0 | 0 | 0 |
| 0, SEG1,CE , "LCD" | AMI, M3, V-LV | 1 | 0 | 0 | 0 | 0 | 0 | 0 |
| 0, SEG1,CE , "LCD" | AMI, M3, S-BM1 | 1 | 0 | 0 | 0 | 0 | 0 | 0 |
| 0, SEG1,CE , "LCD" | AMI, M3, I-50 | 1 | 0 | 0 | 0 | 0 | 0 | 0 |
| 0, SEG1,CE , "LCD" | AMI, M4 | 1 | 1 | 3 | 0 | 1 | 1 | 2 |
| 0, SEG1,MP , "LCD" | AMI | 1 | 1 | 3 | 0 | 1 | 1 | 2 |
| 0, SEG1,MP , "LCD" | AMI, M3 | 1 | 1 | 3 | 0 | 1 | 1 | 2 |
| 0, SEG1,MP , "LCD" | AMI, M3, V-LV | 1 | 1 | 3 | 0 | 1 | 1 | 2 |
| 0, SEG1,MP , "LCD" | AMI, M3, S-BM1 | 1 | 1 | 3 | 0 | 1 | 1 | 2 |
| 0, SEG1,MP , "LCD" | AMI, M3, I-50 | 1 | 1 | 3 | 0 | 1 | 1 | 2 |
| 0, SEG1,MP , "LCD" | AMI, M4 | 1 | 0 | 0 | 0 | 0 | 0 | 0 |

FIG.4C

| AGGREGATED USER FEEDBACK INFORMATION 226 | | | | | | | | |
|---|---|---|---|---|---|---|---|---|
| INPUT DIMENSIONS 250 | OUTPU DIMENSIONS 260 | IMPRESSION COUNT 310 | SELECT COUNT 312 | VIEW COUNT 314 | BID COUNT 316 | PURHASE COUNT 318 | WATCH COUNT 320 | SCORE 322 |
| 0, SEG1, , "LCD" | DLP | 3 | 3 | 9 | 2 | 2 | 1 | 5 |
| 0, SEG1, , "LCD" | DLP, M1 | 3 | 0 | 0 | 0 | 0 | 0 | 0 |
| 0, SEG1, , "LCD" | DLP, M2 | 3 | 3 | 9 | 2 | 2 | 1 | 5 |
| 0, SEG1,CE , "LCD" | AMI | 3 | 3 | 4 | 1 | 1 | 1 | 3 |
| 0, SEG1,CE , "LCD" | AMI, M3 | 3 | 1 | 1 | 1 | 0 | 0 | 1/3 |
| 0, SEG1,CE , "LCD" | AMI, M3, V-LV | 3 | 1 | 1 | 1 | 0 | 0 | 1/3 |
| 0, SEG1,CE , "LCD" | AMI, M3, S-BM1 | 3 | 1 | 1 | 1 | 0 | 0 | 1/3 |
| 0, SEG1,CE , "LCD" | AMI, M3, I-50 | 3 | 1 | 1 | 1 | 0 | 0 | 1/3 |
| 0, SEG1,CE , "LCD" | AMI, M4 | 3 | 2 | 4 | 1 | 1 | 1 | 2 |
| 0, SEG2,CN , "LCD" | AMI | 3 | 3 | 5 | 1 | 1 | 0 | 2 |
| 0, SEG2,CN , "LCD" | AMI, M3 | 3 | 2 | 5 | 1 | 1 | 0 | 4/3 |
| 0, SEG2,CN , "LCD" | AMI, M3, V-GV | 3 | 2 | 5 | 1 | 1 | 0 | 4/3 |
| 0, SEG2,CN , "LCD" | AMI, M3, S-BM4 | 3 | 2 | 5 | 1 | 1 | 0 | 4/3 |
| 0, SEG2,CN , "LCD" | AMI, M3, I-48 | 3 | 2 | 5 | 1 | 1 | 0 | 4/3 |
| 0, SEG2,CN , "LCD" | AMI, M4 | 3 | 1 | 5 | 1 | 1 | 0 | 2/3 |
| 0, SEG1,MP , "LCD" | AMI | 1 | 1 | 3 | 0 | 1 | 1 | 2 |
| 0, SEG1,MP , "LCD" | AMI, M3 | 1 | 1 | 3 | 0 | 1 | 1 | 2 |
| 0, SEG1,MP , "LCD" | AMI, M3, V-LV | 1 | 1 | 3 | 0 | 1 | 1 | 2 |
| 0, SEG1,MP , "LCD" | AMI, M3, S-BM1 | 1 | 1 | 3 | 0 | 1 | 1 | 2 |
| 0, SEG1,MP , "LCD" | AMI, M3, I-50 | 1 | 1 | 3 | 0 | 1 | 1 | 2 |
| 0, SEG1,MP , "LCD" | AMI, M4 | 1 | 0 | 0 | 0 | 1 | 1 | 0 |

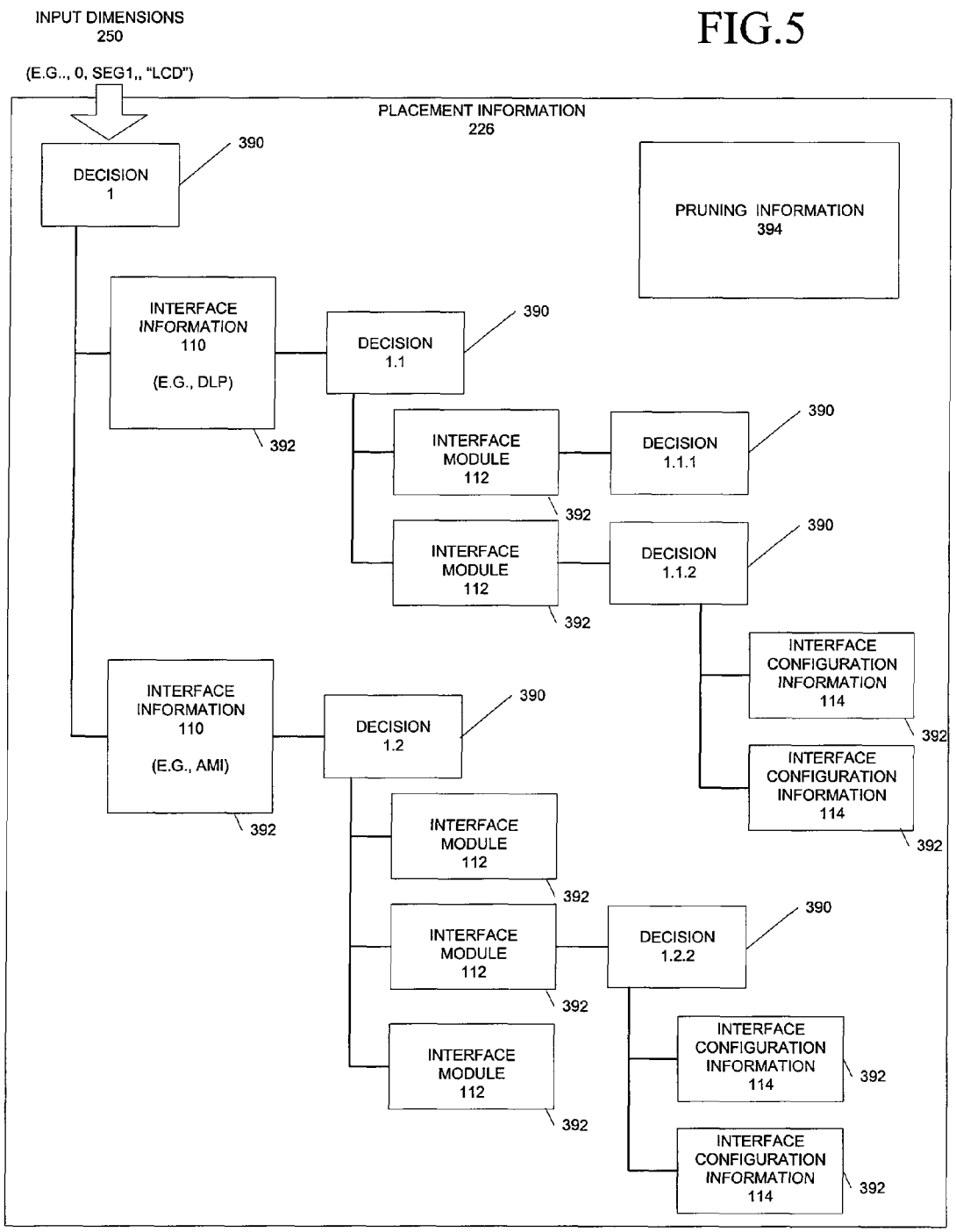

SYSTEM AND METHOD TO LEARN AND DEPLOY AN OPTIMAL USER EXPERIENCE IN AN ONLINE SYSTEM

RELATED APPLICATIONS

This application is related to and hereby claims the priority benefit of U.S. Provisional Patent Application No. 61/059,192 filed Jun. 5, 2008 and entitled "SYSTEM AND METHOD TO LEARN AND DEPLOY AN OPTIMAL USER EXPERIENCE IN AN ONLINE SYSTEM", which application is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008, eBay Inc., All Rights Reserved.

TECHNICAL FIELD

This disclosure relates to methods and systems supporting computing and data processing systems. More particularly, systems and methods to learn and deploy an optimal user experience in an online system is described.

RELATED ART

Conventional systems, like Amazon.com, may use a buyer's previously purchased product or product category/genre to suggest new products in a same or similar category/genre for the user. However, these prior systems are typically one-dimensional. That is, one-dimensional input (e.g. product category/genre) leads to one-dimensional output (e.g. new products in a same or similar category/genre). These conventional systems may not provide multi-dimensional context analysis to provide a multi-dimensional output based on (customized from) a collection of activity from a community of users gathered over time.

BRIEF DESCRIPTION OF THE DRAWINGS

Embodiments illustrated by way of example and not limitation in the figures of the accompanying drawings, in which:

FIG. 4A-4C illustrates use scenarios, according to an embodiment;

FIG. 4D illustrates aggregated user feedback information, according to an embodiment;

FIG. 5 illustrates placement information, according to an embodiment;

DETAILED DESCRIPTION

Figure 1:
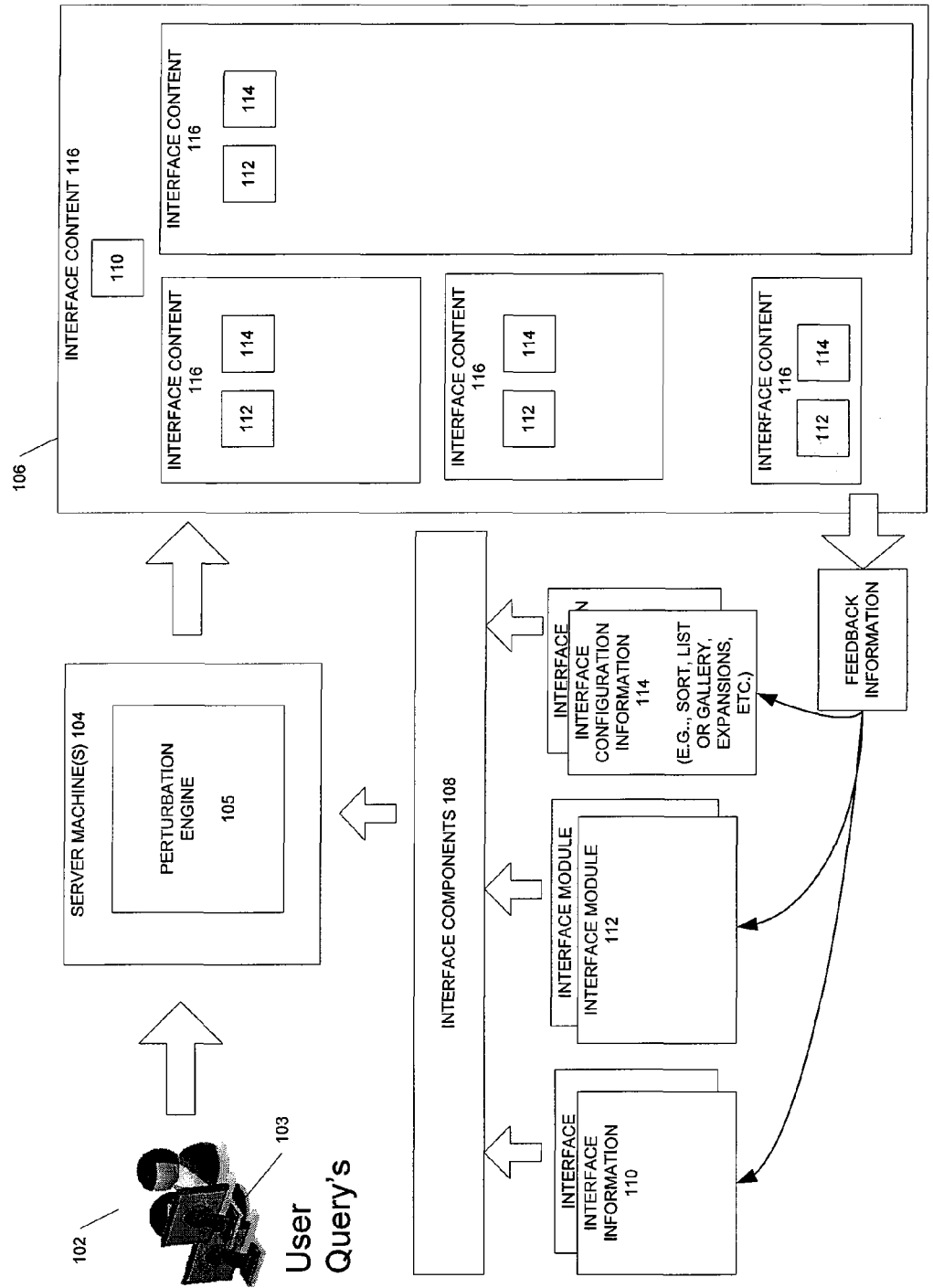
FIG. 1 illustrates a system, according to an embodiment, to learn and deploy an optimal user experience.

In the following description, for purposes of explanation, numerous specific details are set forth in order to provide a thorough understanding of some example embodiments. It will be evident, however, to one of ordinary skill in the art that embodiments of the present invention may be practiced without these specific details.

As described further below, according to various example embodiments of the disclosed subject matter described and claimed herein, there is provided a system and method to learn and deploy an optimal user experience in an online system. The user experience includes a computer-implemented user interface and functionality supporting the processing capabilities provided for a computer user. Various embodiments are described below in connection with the figures provided herein.

In an example embodiment, the system collects user feedback information and uses the collected user feedback information to customize an interface. The system may in one embodiment customize the interface in the form of a web page to include interface components. The system may learn that a choice of a specific interface component is optimal for a specific location on the interface based on a score. The score measures a likelihood of receiving revenue (e.g., financial gain) responsive to including the interface component at the specific location in the interface. For example, the scores of interface components may be compared and the interface component associated with the highest score is identified optimal. In some embodiments, more than one interface component may be identified optimal because the respective scores are identified to be the highest and are statistically insignificant. Further, the system may utilize context information that may be received from a user to learn an optimal choice. Specifically, the context information may include site information (e.g., site identifier), buyer segmentation information (e.g., user/segment profile), domain information (e.g., related product or service category) and keyword information (e.g., user's search query/keywords). The system may use the context information to identify the relative value of multiple interface components at the specific location in a navigation stream, a series of related interfaces that respectively include multiple and addressable locations, the interfaces and locations being populated with the interface components. The system may perform the following customization operations:

1. learn in a learn mode and deploy in an idle mode an optimal interface component that is chosen from multiple interface components based on scores that are associated with the respective components that are generated during the learn mode. The interface components may include interface information that may be used to generate an optimal interface in the form of a webpage, window, frame, dialog box, textual or image display, or the like. Merely for example, in one embodiment, the web page may include, an all matching items (AMI) web page where the items may match search/browse parameters and be for auction or sale, a dynamic landing (DLP) web page that provide entry to a set of web pages dedicated to a particular purpose, or a registration interface. It will be apparent to those of ordinary skill in the art the other interfaces may be similarly defined;

2. on the selected interface, for each of multiple identified and addressable areas or locations, the system may learn in a learn mode and deploy in an idle mode an interface component in the form of an optimal interface module (e.g., widget). The system may choose from a set of interface modules (e.g. advertisement interface module, link interface module, selection list interface module, information block interface module, etc.) based on scores for the interface modules that are generated during the learning mode. The interface modules may be used to present interface content in the corresponding area or location;

3. for each interface module, the system may learn in a learning mode and deploy in an idle mode an interface component in the form of interface configuration information that is optimal for a specific interface module by choosing from sets of interface configuration information based on respective scores.

In various embodiments described herein, the system may use context information that is received from a user to generate multiple input dimensions that, in turn, may be used to generate multiple output dimensions (selections of interface information, interface modules, and/or interface configuration information) based on user feedback information collected from a community of users.

FIG. 1 illustrates an system 100, according to an embodiment, to learn and deploy an optimal user experience in an online system. The system 100 is shown to include a community of users that includes a user 102 who respectively operates a client machine 103 to establish a connection over a network (e.g., Internet) with server machine(s) 104. The client machine 103 may communicate requests to one or more server machines 104 that may support operations for receiving search queries, searching for items, performing e-commerce transactions, facilitating shopping, receiving and processing bids on goods or services, receiving and processing a purchase of goods or services, browsing for information or items of interest, and the like. Typically, these operations may require input information (e.g. a search query or set of keywords entered as text in an input field of a search engine). In one embodiment, the input information may include context information that may be used by a perturbation engine 105 to automatically optimize an experience of the user.

Merely for example, the perturbation engine 105 may be used to generate, for some users, an interface 106 based on selections of interface components 108 that are designated sub-optimal, the interface components 108 including interface information 110, interface modules 112 and/or interface configuration information 114. In one embodiment, the interface information 110 may be used to generate the interface 106. Further, the interface 106 may include multiple areas or locations that may be populated with the interface modules 112 that, in turn, may be respectively configured with the interface configuration information 114 (optional). To this end, the perturbation engine 105 may select a particular interface module 112 from a plurality of available interface modules 112 (e.g. list, graphic, data input, etc.). As described herein, the interface module 112 is an interface component 108 that may be selected or manipulated by a user. The interface module 112 may, for example, include a window, frame, or a text box and provide a single interaction point for the direct manipulation of a given kind of data. The interface information 110 and the interface module 112 may include a widget that may, for example, be a visual basic building block which, when combined with the respective interface component 108, hold data processed by the interface component 108 and supports interactions on this data. The data, for example, may be interface content 116 that is selected by the perturbation engine 105 from a plurality of interface content sources (e.g. store locations, merchandise listings, advertising items, etc.). The perturbation engine 105 may further use the interface configuration information 114 to configure the interface content 116 that is communicated via the interface modules 112 on the interface 106. The particular interface configuration information 114 may be selected by the perturbation engine 105 from a plurality of available interface configuration information 114 (e.g. sort order, list or gallery display, expansion display, etc.).

Once the interface 106 is generated, the system 100 may communicate the interface 106 to the client machine 103 and monitor subsequent interactions with the interface 106 to generate feedback information to re-affirm a previously identified interface component 108 as optimal or to identify another interface component 108 as optimal. Merely, for example, a score may be maintained for each of five interface components that are appropriate for a specific location on the interface. A score for a first interface component may be updated after the generation of the interface with the first component and communication of the interface to the user. A score for a second interface component may be updated after the generation of the interface with the second component and communication of the interface to the user and so forth. Further, the click streams of the users may be monitored subsequent to communication of the interface. The click streams may be utilized to update the scores. In one embodiment, the scores may increase responsive to detecting a purchase of an item or the entry of a bid for an item. Other embodiments may monitor other activities. Assume that after a sufficient number of interfaces have been generated, communicated, and monitored the first interface component is associated with a score of one hundred and the four other interface components are associated with scores of less than five. Responsive to a comparison of the scores, the system may identify the first interface component as optimal for the location on the interface. Henceforth, the majority of interfaces generated may include the first interface component that was identified as optimal. The majority of interfaces would be generated with the first interface component to increase the probability of receiving revenue. The other interfaces generated (e.g., minority) may be utilized to learn a measure of likelihood of generating revenue based on other interface components. For example, the other interface components may include newly seeded interface components. Accordingly, the system 100 may seed an interface component 108, learn the interface component 108 is optimal and deploy the interface component 108 on the interface 106 to achieve an optimal user experience.

Figure 2:
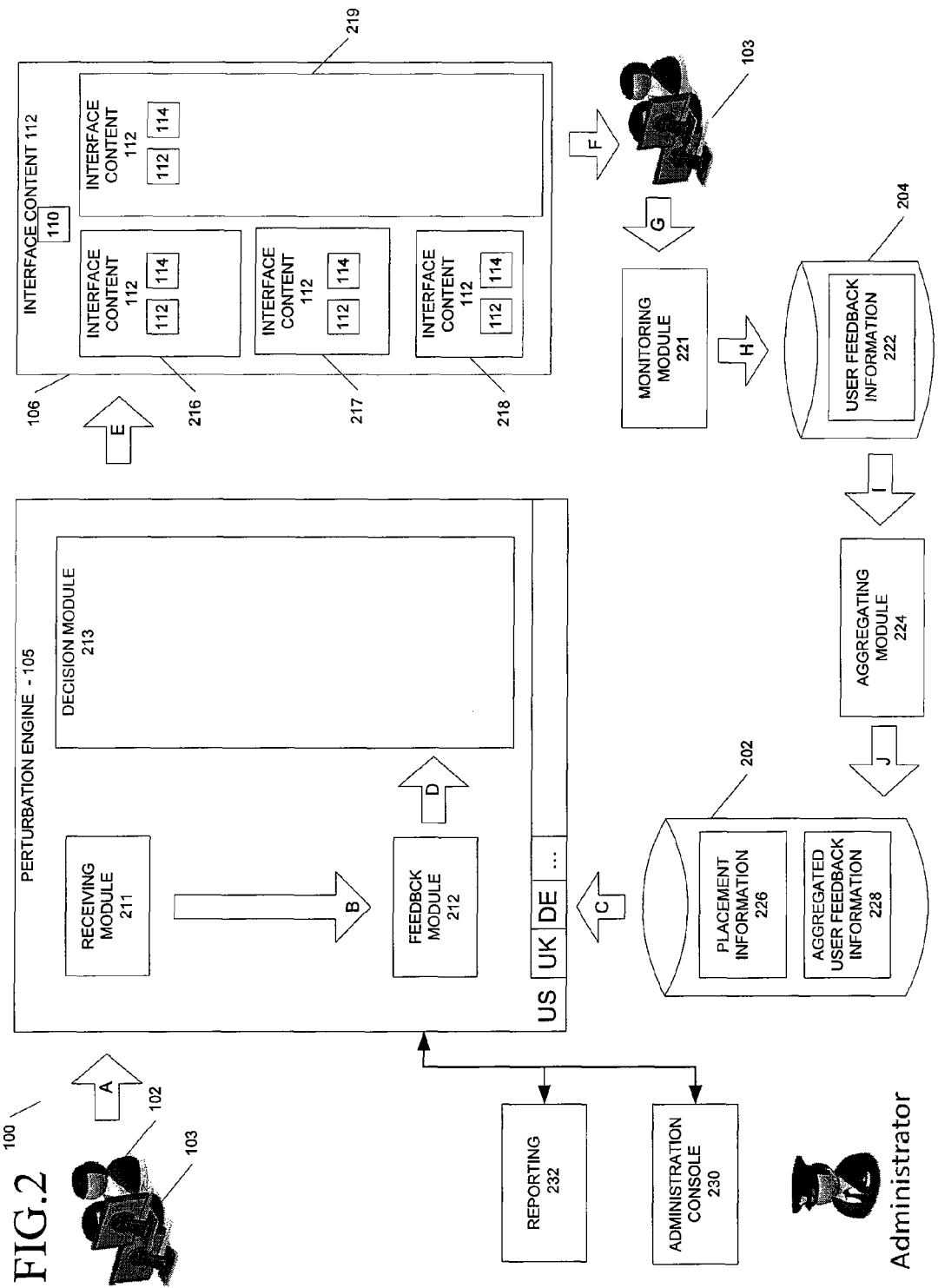
FIG. 2 further illustrates the system, according to an embodiment, to learn and deploy an optimal user experience.

FIG. 2 illustrates a more detailed view of the system 100, according to an embodiment, to learn and deploy an optimal user experience in an online system. The system 100 is shown to include a client machine 103 operated by the user 102. The system 100 is further shown to include a perturbation engine 105, a monitoring module 221, and an aggregating module 224 that respectively execute on at least one server machine 104 that communicate over a network (not shown). The perturbation engine 105 may include a receiving module 211, a feedback module 212, and a decision module 213. The feedback module 212 and the aggregating module 224 are coupled to a database 202 that stores placement information 226 and aggregated user feedback information 228. The monitoring module 221 and the aggregating module 224 are coupled to a database 204 that stores user feedback information 222. The databases 202, 204 are coupled to the at least one server machines 104 that communicate over the network (not shown)

At operation "A," the client machine 103 communicates context information to the receiving module 211. At operation "B", the receiving module 211 collects additional information based on the received context information and communicates the cumulative information as input dimensions to a feedback module 212. At operation "C," the feedback module 212 retrieves the placement information 226 that is identified based on the input dimensions and the aggregated user feedback information 228 that is further identified based on the input dimensions. The placement information 226 may be utilized to identify decision points (e.g., decisions) and choices associated with the respective decision points that are necessary to select the interface components 108 to generate the interface 106.

At operation "D," the decision module 213 may utilize the placement information 226 and the aggregated user feedback information 228 to select interface components 108 that are used to generate the interface 106. Merely for example, the decision module 213 may utilize the placement information 226 to identify nine decision points. Specifically, the decision module 213 may require one decision to choose interface information 110 corresponding to the interface 106, four decisions to choose the four interface modules 112 to be placed at the locations 216, 217, 218 and 219 and four decisions to choose four interface configuration information 114 to be applied to the chosen interface modules 112. The system 100 collects user feedback information 222. Specifically, the perturbation engine 1004 learns by acquiring data sufficient to generate a predictable model in the form of a reliable score for an interface component 108.

At operation "E" the decision module 213 generates the interface 106 and at operation "F" the decision module 213 communicates the interface 106 to the client machine 103. At operation "G," a monitoring module 221 may acquire data on the interface components 108 in the form of user feedback information 222 by monitoring user selections.

At operation "H," the monitoring module 221 stores the user feedback information 222 in the database 204. Specifically, the monitoring module 221 stores the user feedback information 222 according to sessions. Each session may include operations that include activities performed by the user, such as using a pointing device (e.g. computer mouse) to select, click, or mouseover various options, items, or links on interface 106, enter a search query or set of keywords, update a user profile, enter text into an interface 106 provided data entry field, browsing, shopping, bidding, or buying on-line, providing explicit feedback on a user experience, and other types of well-known user interactions with a computer-implemented user interface. These user activities may be recorded and saved in combination with information indicative of the structure and content of the interface 106 with which the user was interacting at the time the user activity was recorded. The system may use the collected user feedback information 222 to correlate actions performed by a user with the interface 106. Accordingly, the relevance or desires of the user may be inferred from the user feedback information 222 in the form of scores that measure a likelihood of receiving revenue (e.g., financial gain) by including the associated interface component 108 in the interface 106.

At operation "I," the aggregating module 224 reads the user feedback information 222 from the database 204 according to sessions and aggregates the user feedback information 222 according to interface components 108 before storing the aggregated user feedback information in the database 202. The above operations may be repeated for a community of users.

FIG. 2 also shows the perturbation engine 105 as including regional configurations (e.g., US, UK, DE, etc.). The regional configurations may, for example, be provided for a country, state, county, or the like. In one embodiment, a site may include areas that are served by one or more computing sites, hubs, servers or server farms, and the like. For any given regional configuration, the perturbation engine 105 may be configured to generate interfaces 106 with functionality that is customized for the region/site and based on aggregated user feedback information 228 that is relevant for the selected region/site.

FIG. 2 also illustrates the system 100, in an embodiment, as including an administration console 230. The administration console 230 may provide access to an administrator access/control level that may be utilized to cause a generation and display of various reports 232. Merely for example, the reports may be used to highlight internal operations of the perturbation engine 105 or internal operations of other components supported by the system 100. The administration console 230 may further provide visibility into a history of identified decision points. For example, the administration console 230 may provide a chronology that illuminates the promotion or demotion of an interface component relative to specific set of input dimensions for a specific decision point.

Figure 3:
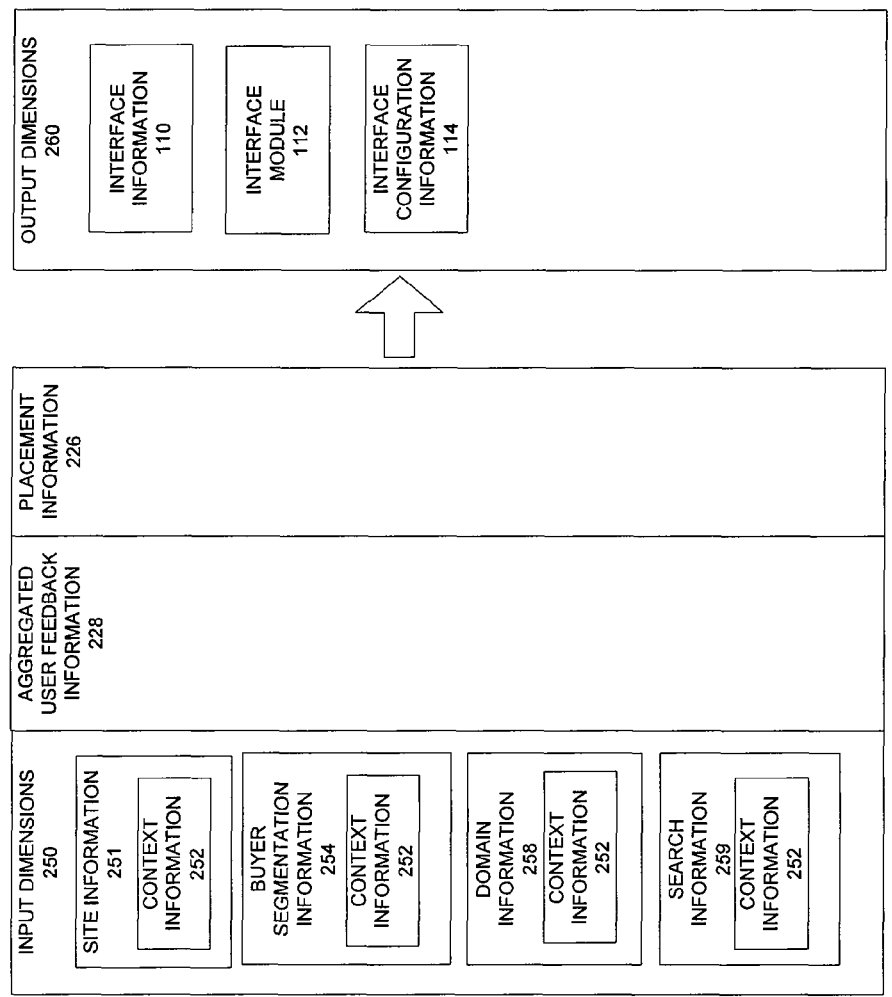
FIG. 3 illustrates a data flow, according to an embodiment, to learn and deploy an optimal user experience in the system.

FIG. 3 illustrates a data flow, according to an example embodiment, to learn and deploy an optimal user experience in an online system. The data flow includes input dimensions 250, aggregated user feedback information 228, placement information 226 and output dimensions 260. The input dimensions 250 in conjunction with the aggregated user feedback information 228 and the placement information 226 may be used by the perturbation engine 105 to generate the output dimensions 260.

The input dimensions 250 may include site information 251, buyer segmentation information 254, domain information 258, and search information 259 that respectively include context information 252. The site information 251 may include a user/buyer name, location information, community information, Internet Protocol address, user profile information, and the like. The buyer segmentation information 254 may include class information that is used to classify the user/buyer (e.g., purchaser class, bidder class, shopper class). The domain information 258 may be used to identify a category, server machine, website, or network location, that the user/buyer has directly or indirectly identified. The search information 259 may include keywords or search parameters received from the user (e.g., query) or provided by another source based on the search information received from the user.

The context information 252 may be included in a request that is received from the client machine 103. The input dimensions 250 that are not identified as context information 252 may be retrieved from another source based on the context information 252. Merely for example, the input dimensions 250 not identified as context information 252 may be retrieved from a local or remote database based on the context information 252.

Input dimensions 250 not identified as context information 252 may include a related product or service category, a user/segment profile or other user information, site identifier (ID), domain, etc. The related product or service category may include category(s) of products or services that relate to the searches or e-commerce transactions a user may have currently or previously submitted. A user/segment profile or other user information represents a user profile explicitly entered by a user or implicitly generated based on past user activity or behaviour. The user profile may specify various demographic information, configurations, defaults, preferences, and the like associated with a particular user or group of users. User information may include explicitly or implicitly obtained demographic information, explicitly or implicitly obtained user profile or preference information, user transaction history, user activity history, and/or any other information explicitly or implicitly obtained that may indicate user preferences. The site identifier (ID) or domain name may specify a particular network location or geographic location associated with a user or group of users.

Rolling Up

The input dimensions 250 may be dynamically prioritized, re-ordered, and/or re-grouped to facilitate processing by the perturbation engine 105. For example, an input dimension 250 that is utilized to identify aggregated user feedback information 228 that is insufficient or inaccurate to generate a predictive model for interface components 108 may be re-ordered to a less valued position or eliminated. In this manner, the input dimension 250 may be "rolled up" (e.g., ordered or grouped) to a more abstract input dimension 250 that is associated with sufficient and accurate aggregated user feedback information 228. Merely for example input dimensions 250 may include site information 251 that identifies a "US site," buyer segmentation information 254 that identifies a "high volume buyer," domain information 258 that identifies the category "tractor," and search information 259 that includes the keywords "red tractor." Responsive to identifying insufficient aggregated user feedback information 228 corresponding to the input dimension 250 "red tractor," the perturbation engine 105 may map the input dimensions 250 for "red tractor" to the input dimension 250 for the category "tractor" and utilize the corresponding aggregated user feedback information 228 for the category "tractor" instead of the aggregated user feedback information 228 for the keywords "red tractor." Accordingly, the perturbation engine 105 may "roll up" from insufficient aggregated user feedback information 228 to sufficient aggregated user feedback information 228 to form a predictive model for a interface component 108. In one embodiment, the perturbation engine 105 may "roll up" at multiple levels. For example, the perturbation engine 105 may roll up search information 259 to domain information 258, roll up domain information 258 to buyer segmentation information 254, and roll up buyer segmentation information to site information 251.

The output dimensions 260 include interface information 110, interface modules 112, and interface configuration information 114 that are utilized to generate an interface 106. The output dimensions 260 may be chosen/selected by the perturbation engine 105 based on the input dimensions 250, the aggregated user feedback information 228, and the placement information 226.

FIG. 4A is a block diagram illustrating a use scenario 280, according to an embodiment. The use scenario 280 includes a representation of a user session 282 that is monitored by the monitoring module 221 to generate user feedback information 222. The user session 282 may be initiated responsive to the perturbation engine 105 receiving a query including keywords and/or a category and/or parameters, etc. or by the perturbation engine 105 detecting browsing within a specific category. The user session 282 may be terminated by the perturbation engine receiving a refining a search (e.g., initial query "ipod"=>refinement "iPod nano"), receiving a new query (e.g., initial query "ipod"=>new query "Harry Potter"), receiving a category refinement not included in a previously selected category, receiving a selection of a predetermined type of interface 106, or by identifying a predetermined amount of time has elapsed without receiving a request from the user.

The user session 282 is shown to include interfaces 106 in the form of a home page (HP) interface, an all matching items (AMI) interface, and a dynamic landing (DLP) interface that were communicated by the perturbation engine 105 to the client machine 103 and user selections that were received by the perturbation engine 105 in the form of a view user selection (VIEW; (e.g., requesting details of an item)), and a bid user selection on the item (BID)). The user session 282 further illustrates interface modules 112 in the form of a module three (M3) and a module four (M4) appearing in association with a specific interface 106. Merely for example, the user session 282 shows the AMI interface as being communicated twice to the client machine 103 and respectively including the M3 and M4 interface modules 112. The interface modules M3 and M4 are further shown to be configured with interface configuration information 114 shown as "V-LV," "S-BMI," and "I-50" that correspond to various views, sorts, and presentations. Broadly, the user session 282 shows a user navigating to a home page (HP) interface; entering the keywords "LCD" causing navigation to a DLP interface; clicking on a best matching category, "CE" (Consumer Electronics), causing navigation to an AMI interface; clicking on a user interface component supported by the "M3" interface module 112 causing navigation to the AMI interface again; clicking on an item causing navigation to a view item interface and bidding on the item. The user session 282 further shows the interface modules 112 "M1 and M2" as being included in the DLP interface and the interface modules 112 "M3 and M4" as being included in the AMI interface.

The user feedback information 222 includes multiple rows. Each row includes a score 322 that is assigned to a specific combination of input dimensions 250 and output dimensions 260. Specifically, the combination of input dimensions 250 and output dimensions 260 correspond to a choice of an interface component 108 at a decision point in a hierarchy of decision points, as defined according to placement information 226, as described in more detail later. Merely for example, a row 284 corresponds to an interface component 108 in the form of a dynamic landing page (DLP) interface 106 that was selected/chosen responsive to input dimensions 250 including site information 251 in the form "0,' buyer segmentation information 254 in the form "SEG1," no domain information 258, and search information 259 in the form of the keywords "LCD."

The scores 322 may be updated at each decision point in the hierarchy (e.g., one or more rows) responsive to receiving a selection to view an item or bid on an item or purchase an item or watch an item. A selection to view an item (e.g., request detailed information on the item) may cause a view count 314 to be incremented. A selection to bid on an item may cause a bid count 316 to be incremented. A selection to purchase an item may cause a purchase count 318 to be incremented. A selection to watch an item (e.g., monitor the item for various activity) may cause a watch count 320 to be incremented. Each row further includes an impression count 310 and a select count 312. The impression count 310 is utilized to count the number of times the interface component 108 that is associated with the decision point (e.g., row) was communicated to the client machine 103 during the user session 282. Merely for example, the FIG. 4A includes a row 286 that includes an impression count 310 with the value of "2" to indicate the AMI interface 106 was communicated twice to the client machine 103 during the user session 282. The select count 312 may be incremented responsive to the user selecting the interface component 108 associated with the decision point (e.g., row) during the user session 282. In one embodiment, the score 322 may be updated as follows:

$$S=(SC/IC)*(BC*K1+PC*K2+WC*K3)$$

Where:
S=score 322
SC=select count 312
IC=impression count 310
BC=bid count 316
PC=purchase count 318
WC=watch count 320
K1=Constant
K2=Constant
K3=Constant In one embodiment the score 322 may measure a likelihood of receiving revenue (e.g., financial gain) by including the interface component 108 in the interface 106.

FIG. 4B is a block diagram illustrating a use scenario 350, according to an embodiment. The use scenario 350 includes a representation of a user session 352 that is monitored by the monitoring module 221 to generate the user feedback information 222. Broadly, the user session 352 shows a user navigating to home page (HP) interface; entering the keyword "LCD," receiving a dynamic landing page (DLP) interface; clicking on a best matching category, "CN" (Computers & Networking), receiving an all matching items (AMI) interface; clicking on a first user interface component supported by the "M3" module causing navigation to the AMI interface again; clicking on a second user interface component supported by the "M3" module causing navigation to the AMI interface again; clicking on an item causing navigation to a view item (VI) interface and bidding (BID) on the item; clicking on another item and purchasing (PURCHASE) the item. The user session 352 further shows the interface modules 112 "M1 and M2" as being included in the DLP interface and the interface modules 112 "M3" and "M4" as being included in the AMI interface. The user session 352 further shows the user as viewing five items. The scores 322 are computed as previously described.

FIG. 4C is a block diagram illustrating a use scenario 370, according to an embodiment. The use scenario 370 includes a representation of a user session 372 that is monitored by the monitoring module 221 to generate the user feedback information 222. Broadly, the user session 372 shows a user navigating to home page (HP) interface; entering the keyword "LCD" causing navigation to a dynamic landing page (DLP) interface; clicking on a best matching category, "CE" (Consumer Electronics) causing navigation to an all matching items (AMI) interface; clicking on a subcategory supported by the "M3" interface module 112 causing navigation to the AMI page again; clicking on an first item causing navigation to a view item (VI) interface; adding the item to a "watch list" (WATCH); clicking on a second item and purchasing the second item (PURCHASE). The user session 372 further shows the interface modules 112 "M1" and "M2" as being included in the DLP interface and the interface modules 112 "M3" and "M4" as being included in the AMI interface. The user session 372 further shows the user as viewing three items. The scores 322 are computed as previously described.

FIG. 4D illustrates aggregated user feedback information 228, according to an embodiment. The aggregated user feedback information 228 may be generated by the aggregation module 224. Specifically, the aggregation module 224 may read the user feedback information 222 from the database 204, generate the aggregated user feedback information 228 and store the aggregated user feedback information 228 on the database 202. The aggregation module 224 may generate the aggregated user feedback information 228 by aggregating the data from multiple rows of common input dimensions 250 and output dimensions 260 into a single row of common input dimensions 250 and output dimensions 260. Merely for example, a row 380 includes aggregated impression counts 310, select counts 312, view counts 314, bid counts 316, purchase counts 318, watch counts 320 and scores 322 of rows from the previously described user feedback information (FIG. 4A, FIG. 4B, and FIG. 4C), the rows aggregated further exhibiting matching input dimensions 250 including "0, SEG1, "LCD"" and the matching output dimensions 260 including "DLP."

FIG. 5 illustrates placement information 226, according to an embodiment. The placement information 226 may be utilized to evaluate whether an interface component 108 is to be utilized in the generation of an interface 106. The placement information 226 may be retrieved by the feedback module 212 based on a set of input dimensions 250 and communicated to the decision module 213. The placement information 226 is shown to include a decision tree in the form of multiple decisions or decision points 390 (e.g., "1," "1.1," "1.1.1," "1.2.2," etc.). Each decision point 390 may be associated with one or more choices 392 that respectively correspond to an interface component 108. Each decision point 390 corresponds to a unique combination of input dimensions 250 and output dimensions 260. Merely for example the decision 390 at "1" corresponds to the input dimensions 250 "0, SEG1, 'LCD'" and no output dimensions 260. Further for example, the decision point 390 at "1.1" corresponds to the same input dimensions and the output dimension 260 "DLP." The other decision points 390 may be identified in the same manner. Accordingly, the placement information 226 may enable a collection of user feedback information 222 at specific decision points 390 to a enable a comparison of interface components 108 based on the scores 322 that are meaningful at the specific decision points 390.

Pruning the Decision Tree

The placement information 226 is further shown to include pruning information 394. The pruning information 394 may store a predetermined condition and a choice 392 for a decision point 390. In one embodiment the pruning information 394 may be configured by an administrator. The decision module 213 may utilize the pruning information 394 to prune the decision tree. For example, the decision module 213 may compare a predetermined condition with context information 252 that is received from the client machine 103. If, for example, the predetermined condition matches the context information 252 then the decision module 213 utilizes the predetermined choice 393 for the decision point 390. In this manner the administrator may prune a decision tree by forcing a choice 392 in the decision tree. In one embodiment, the decision module 213 may compare the predetermined condition with input dimensions 250 instead of the context information 252. In one embodiment, a match may force the selection of multiple choices 392 in the decision tree.

Figure 6A:
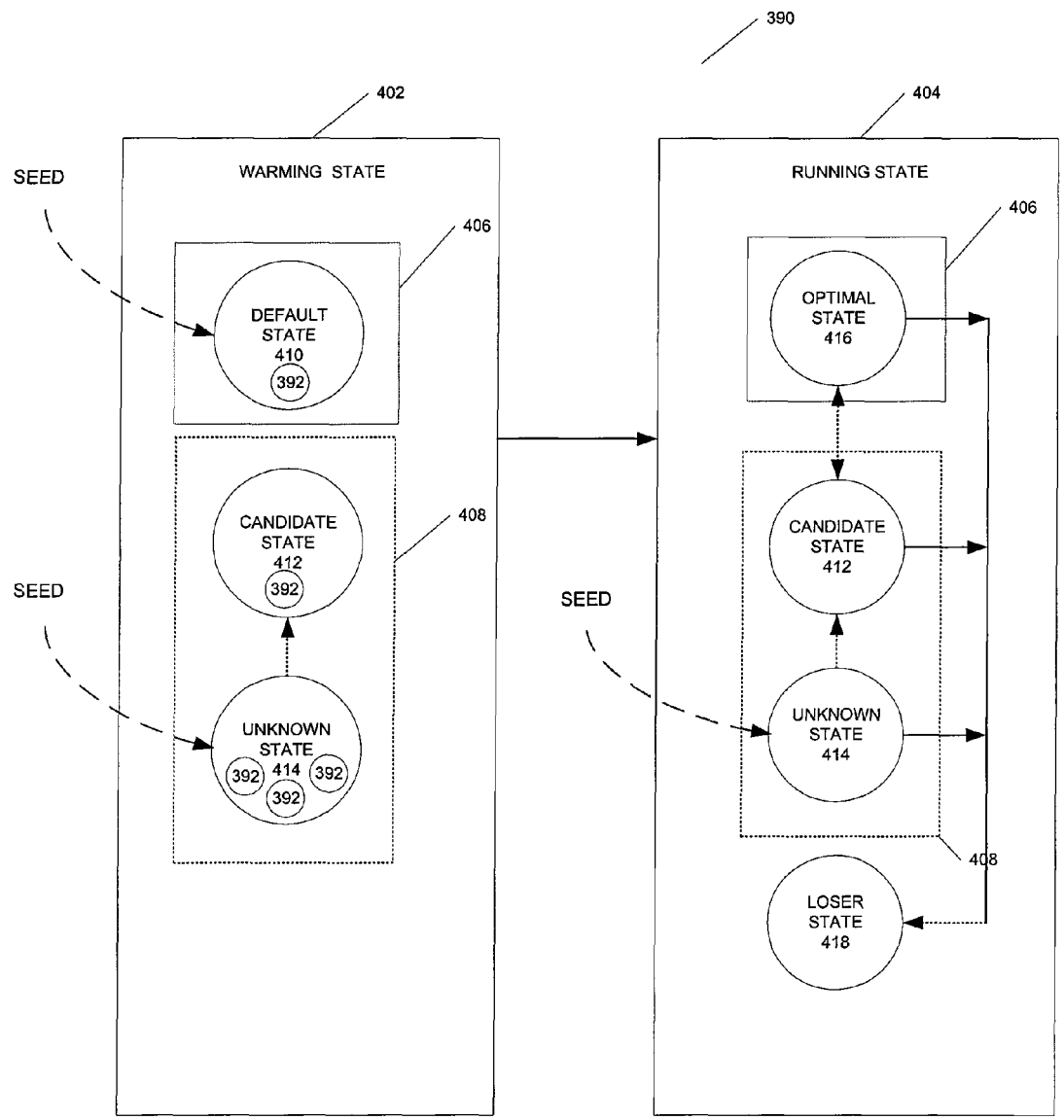
FIG. 6A illustrates a decision point, according to an embodiment.

FIG. 6A illustrates a decision point 390, according to an embodiment. The decision point 390 may be utilized by the perturbation engine 105 to learn an "optimal" interface component 108 at a decision point 390 and to deploy the "optimal" interface component 108 at the same decision point 390. Recall that a decision point 390 may be associated with one or more choices 392 that correspond to different interface components 108 that may be included in an interface 106. Recall further that a decision point 390 may be conceptually located in a navigation stream with a unique set of input dimensions 250 and output dimensions 260. The decision point 390 is illustrated as being in a decision state. The decision state may include a warming state 402 or a running state 404. The decision point 390 is illustrated as being in the warming state 402 but may transition to the running state.

The warming state 402 includes the default state 410, the candidate state 412 and the unknown state 414. FIG. 6A illustrates the warming state 402 as including five choices 392, one choice 392 is illustrated in the default state 410, one choice 392 is illustrated in the candidate state 412, and three choices 392 are illustrated in the unknown state 414. Nevertheless, the decision point 390 may be operational with one choice 392 in the default state 410.

The running state 404 includes the optimal state 416, the candidate state 412, the unknown state 414, and the loser state 418.

The warming state 402 and the running state 404 may further be classified according a learn mode 408 and an idle mode 406. The idle mode 406 utilizes choices 392 in the optimal state 416 and the default state 410. The learn mode 408 utilizes choices 392 in the candidate state 412 and the unknown state 414.

Warming State

The decision point 390 may be initially registered in a warming state 402 and seeded with a single choice 392 in a default state 410 and a single choice in the unknown state 414. Specifically, an administrator may register and seed the decision point 390. Additional choices 392 may be seeded into the unknown state 414.

A choice 392 may transition from the unknown state 414 to the candidate state 412. The choice 392 may transition responsive to collecting sufficient user feedback information 222 to identify the relative value of the choice. Specifically, the choice 392 may transition responsive to the perturbation engine 105 identifying an impression count 310 that exceeds a predetermined threshold. Recall that the choice 392 may be associated with an interface component 108 that is associated with an impression count 310 at the decision point 390. The so called impression count 310 may be incremented each time the choice 392 at the decision point 390 is selected thereby recording inclusion of the corresponding interface component 108 in an interface 106 that is communicated to the client machine 103. Accordingly, a choice in the candidate state 412 may be said to exhibit a minimal "coverage" in comparison with a choice 392 in the unknown state 414. In one embodiment the predetermined threshold may slide in a step-wise fashion (e.g., step function) as follows:

| Impression Count at Decision "D" | Predetermined Threshold |
|---|---|
| $IC_D > 100K$ | $IC_{X-} 1K$ |
| $IC_D > 10M$ | $IC_{X-} 10K$ |
| $IC_D > 100M$ | $IC_{X-} 100K$ |

Where:

$IC_D = IC_{1-N}$

Specifically, the predetermined threshold for a single choice 392, at a decision point 390, to transition from the unknown state 414 to the candidate state 412 may increase according to an increase in the impression count 310 for all choices 392 at the decision point 390.

Decision Transition

The decision point 390 may transition from the warming state 402 to the running state 404. The decision point 390 may transition from the warming state 402 to the running state 404 responsive to perturbation engine 105 identifying at least two choices 392 in the candidate state 412.

Running State

The decision point 390 may include choices 392 that may transition between states. A choice 392 may transition from the unknown state 414 to the candidate state 412 as previously described. Accordingly, a choice 392 in the candidate state 412 may be said to transition from the unknown state 414 to the candidate state 412 by exhibiting a minimal "coverage."

A choice 392 may transition from the candidate state 412 to the optimal state 416. The transition may be based on the previously described score 322. Specifically, the scores 322 associated with each of the choices 392 may be sorted in descending order. Further, a set of top N choices 392 may be identified based on a predetermined threshold. For example:

PT %<= $\Sigma IC_{0-N}$ at D/$\Sigma IC_{0-X}$ at D

Where:
PT=predetermined threshold (e.g., 95%)
$\Sigma IC_{0-N}$ at D=sum of impression count 310 of top N choices 392 at decision point 390
$\Sigma IC_{0-X}$ at D=sum of impression count 310 of all choices 392 at decision point 390

In one embodiment, the choice 392 associated with the highest score 322 may transition from the candidate state 412 to the optimal state 416. In one embodiment, multiple choices 392 that are respectively associated with the highest scores 322 may transition from the candidate state 412 to the optimal state 416. Specifically, the multiple choices 392 may transition from the candidate state 412 to the optimal state 416 responsive to identifying a difference between the respective scores 322 as insignificant. In one embodiment, the threshold of insignificance may be determined based on a statistical margin of error. Specifically, if a score 322 is less than or equal to the statistical margin of error then the choice 382 may transition from the candidate state 412 to the optimal state 416. In such instances, the traffic associated with the idle mode may be equally distributed to the choices 392 in the optimal state 416.

A choice 392 in the optimal state may automatically receive the majority of traffic at the decision point 390. Specifically, because a choice 392 in the optimal state 416 is likely to be associated with receiving revenue the perturbation engine is designed to include the corresponding interface component 108 in the interface 106 in a majority of instances.

A choice 392 may transition to the loser state 418. Specifically, a choice 392 may transition from the optimal state 416, candidate state 412, or unknown state 414 to the loser state 418 based on the score 322 associated with the choice 392. In one embodiment, a choice 392 in the candidate state 412 or unknown state 414 may transition to the loser state 418 responsive to identifying such a choice 392 as consistently underperforming the choice 392 in the optimal state 416. In one embodiment, a choice 392 in the optimal state may transition to the loser state 418 responsive to identifying such a choice 392 as consistently underperforming the choice 392 in the default state 410.

In the running state 404, a choice 392 may be seeded in the unknown state 414 at the decision point 390.

Figure 6B:
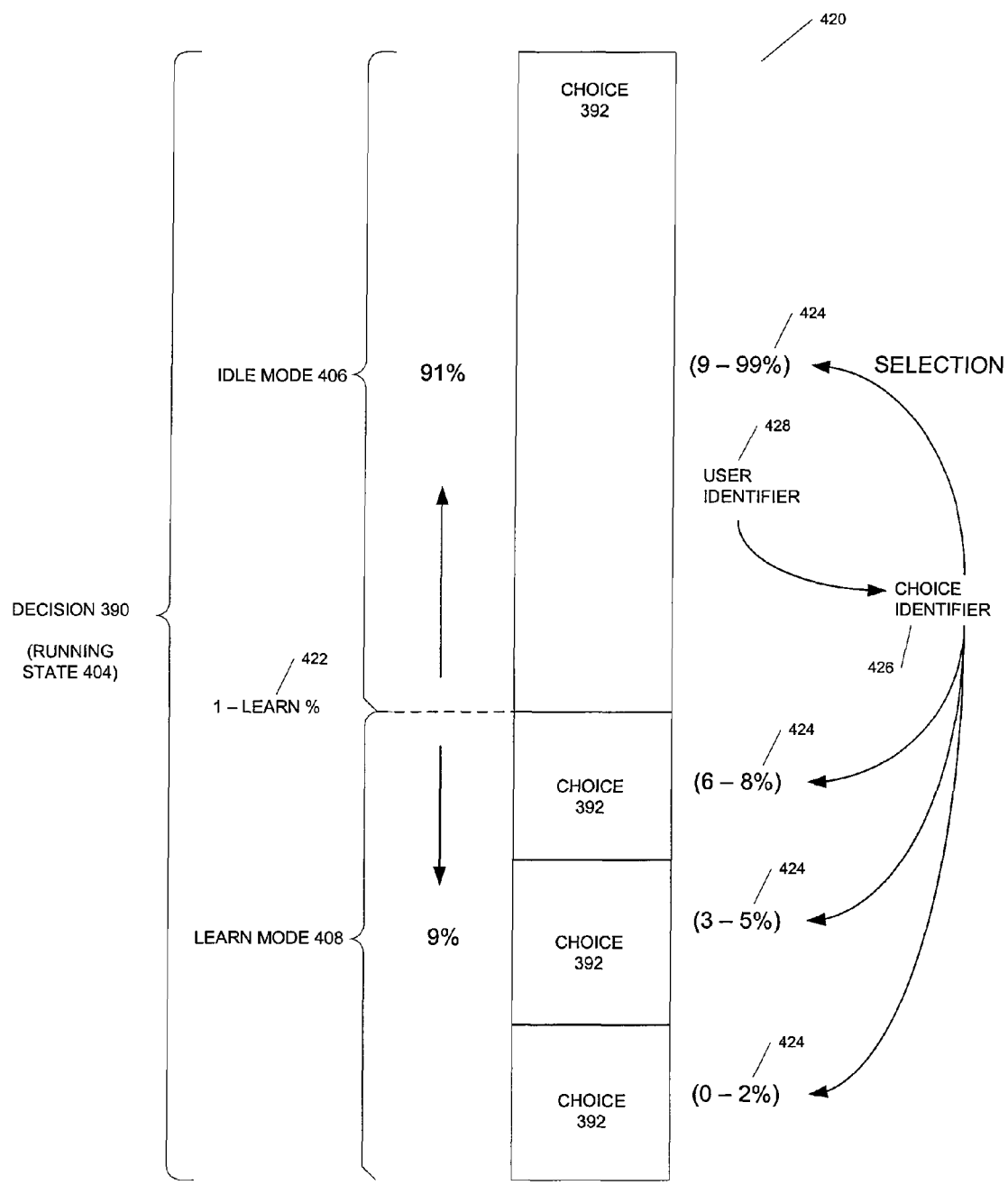
FIG. 6B illustrates constructs, according to an embodiment, to choose an interface component 108 at a decision point, according to an embodiment.

FIG. 6B illustrates constructs 429, according to an embodiment, to choose an interface component 108 at a decision point 390. The constructs 429 include a learning percentage 422 that is generated based on a set of factors, a set of choice ranges 424 that are generated based on the learning percentage 422 and respectively assigned to multiple choices 392 at the decision point 390, and a choice identifier 426 that is generated based on a user identifier 428 that uniquely identifies a user, the choice identifier being utilized in conjunction with the set of choice ranges 424 to select a choice 392. Recall that a decision point 390 may be associated with multiple choices 392 that respectively correspond to different interface components 108 one of which is chosen to be included at the decision point 390 in an interface 106 that is communicated to a user in response to receiving a request from the user that includes the user identifier 428 that uniquely identifies the user. The constructs 429 illustrate the decision point 390 in the running state 404, nevertheless, the comments below are substantially applicable to the warming state 402.

Generation of Learning Percentage

The learning percentage 422 may be generated based four on factors including a coverage factor, a cost of learning factor, a time to learn factor, and a confidence factor.

Coverage Factor

The coverage factor (COV) expresses a rate of coverage. The rate of coverage may be expressed as the coverage at a decision point 390 divided the coverage at a set of input dimensions 260 that include the decision point 390. Specifically, the numerator of the rate is a sum of impression counts 310 respectively associated with choices 392 at a specific decision 390. The denominator of the rate is a sum of impression counts 310 associated with a set of decisions 390 that are identified with input dimensions 260 that include the specific decision 390. The coverage factor may be computed as follows:

$COV_{Ci}$=Coverage at Choice i $COV_{Di}$=Coverage at Decision i=$\Sigma$ $COV_{Ci-n}$ $COV_{DIMi}$=Coverage at Dimensions i=$\Sigma$ $COV_{Di-n}$ $COV = COV_{Di}/COV_{DIMi}$ Where:
Coverage at Choice i=impression count 310 at a specific choice 392;
Coverage at Decision i=sum of impression counts 310 respectively associated with choices 392 at a decision point 390; and
Coverage at Dimensions i=sum of impression counts 310 respectively associated with decision points 390 at a unique set of input dimensions 260.

Cost of Learning Factor

The cost of learning factor (COL) expresses an expected loss of business revenue to learn an optimal choice at a decision 390. For example, a high cost of learning indicates that a high amount of revenue is being lost to learn. The cost of learning may be computed as follows:

$COL_{Ci}$=Cost of Learning at Choice i $COL_{Di}$=Cost of Learning at Decision i=$\Sigma$ $M_i$*$COL_{Ci-n/n}$ $COL = COL_{Di}$ Where:
Cost of Learning at Choice i=value provided by administrator for a choice 392;
Cost of Learning at Decision i=values provided by administrator respectively scaled by coefficients M; summed, and divided by the number of choices 390 at a specific decision 390.

Time to Learn Factor

The time to learn factor (T) expresses the amount of time required to identify an optimal choice for a specific decision 390. A time to learn factor that increases in value is indicative of requiring more time to learn. The time to learn factor may be expressed in days. For example, a time to learn factor of "1" predicts "1" day would be required to learn a choice 392 that is optimal for a decision 390. The time to learn of factor may be provided by an administrator.

Confidence Factor

The confidence factor (CF) expresses a level or measure of confidence that revenue attributed to a decision 390 may exceed a predetermined threshold notwithstanding the identification of an optimal choice 392. A confidence factor that increases in value is indicative of greater levels of confidence that the revenue received based on a decision 390 may exceed a predetermined threshold without identification of a new optimal choice. The confidence factor may be provided by an administrator.

In summary, the learning percentage 422 may be computed based on the above described four factors as follows:

$L \% = 1/COV*COL*T*CF$

Generation and Assignment of Choice Ranges

The learning percentage 422 may be used to generate and assign a set of choice ranges 424. Returning to FIG. 6B, consider the following example where the learn percentage 422 has been computed to be "9%." First, the learning percentage 422 of 9% may be utilized to generate and assign choice ranges 424 to choices in the learn mode 408. Recall that the learn mode 408 may include all choices 392 in the candidate state 412 or the unknown state 414. Assuming three choices 392 are included in the learn mode 408 including one in the candidate state 412 and two choices 392 in the unknown state 414 then three choice ranges 424 of three percent (e.g., summing to 9%) may be assigned to each of the three choices 392 in the learn mode 408. For example, a choice range 424 of "0-2%" may be assigned to the choice 392 in the candidate state 412, a choice range 424 of "3-5%" may be assigned to the first choice 392 in the unknown state 414, a choice range 424 of "6-8%" may be assigned to the second choice 392 in the unknown state 414. Fewer choices 392 may require fewer and wider choice ranges 424. For example, a single choice 392 in the learn mode 408 may require a singe choice range 424 of "0-8%."

Second, the complement of the learning percentage 422, 91% (e.g., 1—learning percentage 322) may be utilized to generate and assign choice ranges 424 to choices in the idle mode 406. Recall that the idle mode 406 may include choices 392 in the optimal state 416. Assuming a single choice 392 is included in the idle mode 406 including one choice 392 in the optimal state 416 then a choice range 424 of "9-99" may be assigned to the choice 392 in the optimal state 416. Similarly, more choices 392 may require more and narrower choice ranges 424.

Generation of Choice Identifier

The choice identifier 426 may be generated from the user identifier 428 and utilized to select a choice 392 based on the set of choice ranges 424 respectively associated with the choices 292 at the decision point 390. The choice identifier 426 may be a number between 0 and 99.

Recall that the decision point 390 has been entered responsive to receiving a request from a user. In one embodiment, the user may be associated with the user identifier 428 that uniquely identifies the user in the system 100. Merely for example, a client machine 103 may be operated by the user and may store a cookie that includes the user identifier 428 that is communicated to the perturbation engine 105. The user identifier 428 may be utilized to generate the choice identifier 426 as follows:

$$CI=((Hash(UI))MOD\ P)$$

Where:
CI=choice identifier 426
UI=user identifier 428
Hash=hashing function (e.g., MD5)
MOD=modulo (e.g., a modulo n is the remainder after numerical division of a by n)
P=a prime number Merely for example a choice identifier 426 of "14" may be generated based on the following variables:
U=12345abcd
Hash=hashing function MD5
P=1153
Selection of Choice The above choice identifier 426 of '14' may be utilized to select the choice 392 in the optimal state 416. Specifically, the choice identifier 426 of "14' is included in the choice range 424 (e.g., 9-99%) that corresponds to the choice 392 in the optimal state 416.

It will be appreciated that the above constructs may be utilized to accommodate different learning percentages 422 and a wide range of choices 392 in the idle or learn modes 408, 408.

Consistent User Experience

The perturbation engine 105 provides for a consistent user experience. Specifically, the perturbation engine 105 may communicate the same interface content 116 by utilizing the same interface components 108 in response to receiving the same context information 252 from the user 102. The perturbation engine 105 may provide the consistent user experience because the selection of interface components 108, as described above, is based on the user identifier 428 that uniquely identifies the user in the system.

Orthogonal Testing

The perturbation engine 105 provides for non-biased learning by utilizing orthogonal testing. To understand the benefit of orthogonal testing the issue of biased learning is described. Biased learning may occur when the perturbation engine 105 learns a set of optimal choices respectively associated with a serially related set of decision points 390. Specifically, the utilization of the user identifier 428 to select choices 392 for a set of decision points 390 that follow in succession on each other in a navigation stream would ensure biased learning because that the same combination of choices 392 would be consistently presented to the same users. In other words, biased learning may result when specific combination of choices 392 are presented to a narrow set of users. Accordingly, the perturbation engine 105 may compensate for biased learning by introducing orthogonal testing. Orthogonal testing may ensure an independent selection of choices 392 at each decision point 390. Specifically, orthogonal testing may be ensured by utilizing different prime numbers to generate the choice identifier 426 for a serially set of decision points 390, as described above. Consider the following example for the generation of choice identifiers 426 for the same user, the choice identifiers 426 respectively corresponding to a set of serially related decision points A, B, and C.

$$CI\ for\ Decision\ Point\ A=((Hash(UI))MOD\ 1)$$

$$CI\ for\ Decision\ Point\ B=((Hash(UI))MOD\ 3)$$

$$CI\ for\ Decision\ Point\ C=((Hash(UI))MOD\ 5)$$

The different prime numbers "1," "3," and "5" at decision points A, B, and C would ensure that the choices 392 associated with the respective decision points 390 are randomly presented to all of the users.

Figure 7:
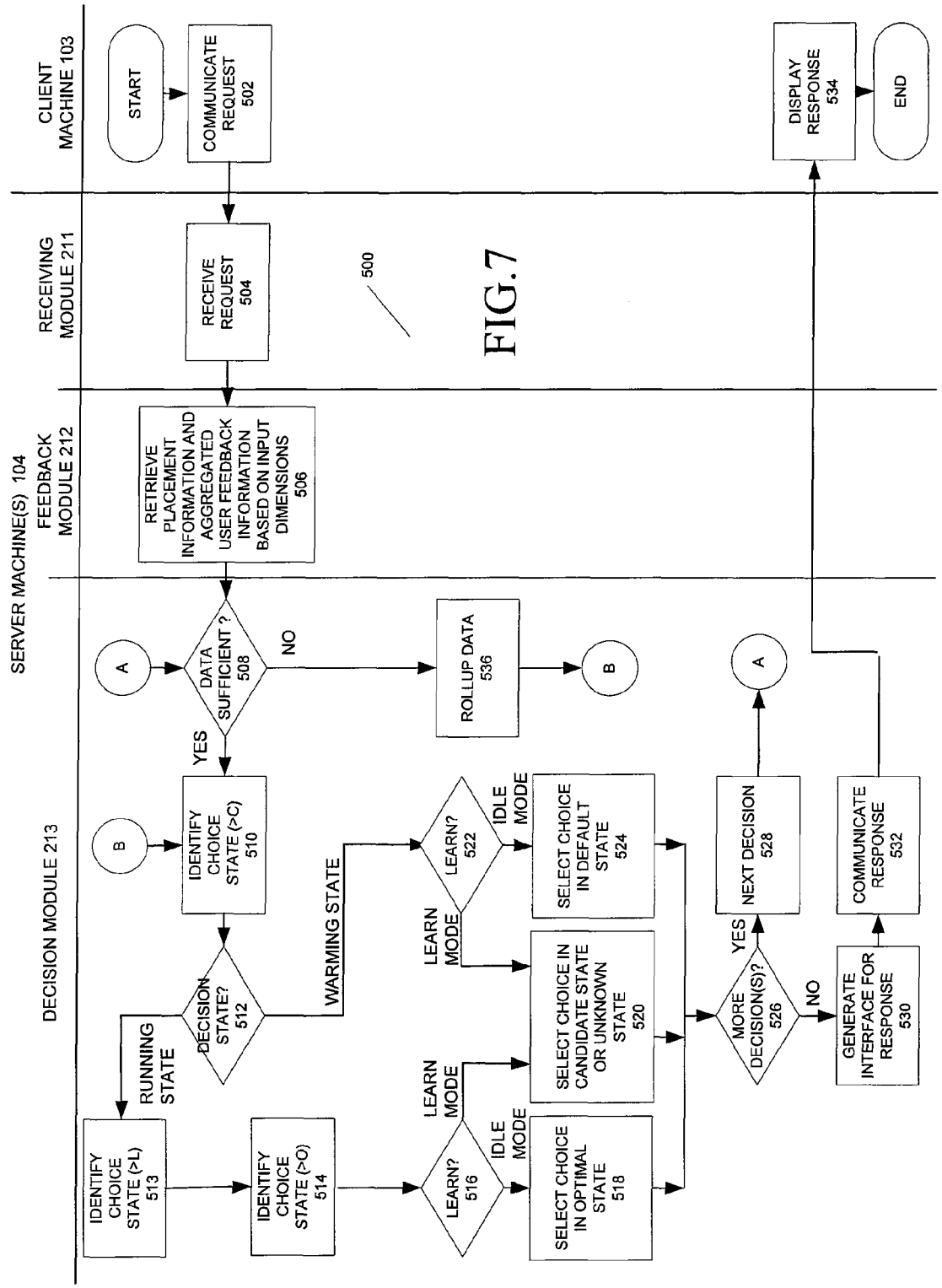
FIG. 7 illustrates a flow chart of a method, according to an embodiment, to learn an optimal user experience in a system.

FIG. 7 illustrates a flow chart of a method 500, according to an embodiment, to learn an optimal user experience in an online system. Illustrated on the right are operations performed on a client machine 103. Illustrated on the left are operations performed on at least one server machine 104. The method 500 commences at operation 502 with the user causing the client machine 103 to communicating a request to the server machines 104. For example, the user may select a user interface element on an interface 106 causing the client machine 103 to communicate the request to the server machines 104. The request may include context information 252 and a user identifier 428.

At operation 504, at the server machine 104, the receiving module 211 receives the request and communicates the request to the feedback module 212. At decision operation 506 the feedback module 212 extracts the context information 252 from the request and utilizes the context information 252 to generate input dimensions 250. Next, the feedback module 212 may utilize the input dimensions 250 to retrieve placement information 226. Merely for example, the feedback module 212 may utilize a table to lookup the placement information 226 based on the input dimensions 250 and to retrieve the placement information 226. Recall that the placement information 226 includes multiple decision points 390 and associated choices 392. Next, the feedback module 212 may retrieve aggregated user feedback information based on the placement information 226. Merely for example, the feedback module 212 may retrieve aggregated user feedback information 228 based on a set of combined input dimensions 250 and output dimensions 260 specified by the decision points 390 and choices 390 in the placement information 226. Recall that each row in the aggregated user feedback information 228 corresponds to an interface component 108 and a score 322 that measures a likelihood of receiving revenue for including the interface component 108 in the interface 106.

At decision operation 508, the decision module 213 identifies whether the aggregated feedback information is sufficient for a specific decision point 390. For example, the decision module 213 may generate a sum by adding the impression counts 310 associated with each of the choices 392 and compare the sum against a predetermined threshold. If the sum is equal to or greater than the predetermined threshold then a branch is made to operation 510. Otherwise a branch is made to operation 536. At operation 536, the decision module 213 "rolls up" or identifies aggregated user feedback information 228 that may be utilized in place of the insufficient aggregated user feedback information 228.

At operation 510, the decision module 213 may identify whether a choice 292 in the unknown state 414 is transitioned to the candidate state 412. The decision module 213 makes the identification for each of the choices 392 at the decision 390 notwithstanding the decision state (e.g., warming state 402 or running state 404). In one embodiment a predetermined threshold may be generated in a step-wise fashion based on the impression count 310 for the decision point 390, as previously described. Next, the impression count 310 associated with each choice 392 in the unknown state 414, at the decision point 390, may be compared with the predetermined threshold. If the impression count 310 associated with the choice 392 is greater than the predetermined threshold then the choice 392 is transitioned from the unknown state 414 to the candidate state 412. The above steps are performed for each choice 392 that is in the unknown state 414 at the decision point 390.

At decision operation 512, the decision module 213 may identify whether a decision point 390 that is in the warming state 402 may be transitioned to the running state 404. First, the decision module 213 identifies whether the decision point is in the warming state 402. If in the decision point 390 is in the warming state, the decision module 213 further identifies whether at least two choices 392 are registered in the candidate state 412. If two choices 392 are registered in the candidate state 412, the decision module causes the decision point 390 to transition to the running state 404 and branches to operation 513. Otherwise the decision module branches to decision operation 552. At operation 513, the decision module 213 may identify whether a choice 292 is transitioned to the loser state 418. The decision module 213 makes the identification for each of the choices 392 in the optimal state 416, the candidate state 412 or the unknown state 414, as previously described. At operation 514, the decision module 213 may identify whether a choice 292 is transitioned to the optimal state 416. The decision module 213 makes the identification for each of the choices 392 in the optimal state 416 and the candidate state 412, as previously described.

At decision operation 516, the decision module 213 identifies whether the decision point 390 is in the idle mode 406 or the learn mode 408 by selecting a choice 392. Specifically, the decision module 213 generates a learning percentage 422, generates a set of choice ranges 424, respectively assigns the choice ranges 424 to the choices 392, generates a choice identifier 426 and selects a choice 392 based on the choice range 424 and the choice identifier 426. Further, the choice range 424 that includes the choice identifier 426 corresponds to the selected choice 392. If the choice identifier 426 is included in a choice range 424 that corresponds to a choice 392 in the optimal state 416 then the decision point 390 is identified to be in the idle mode 406 and a branch is made to operation 518. Otherwise the decision point 390 is identified to be in the idle mode 406 and a branch is made to operation 520.

At operation 518, the decision module 213 associates the selected choice 392 (optimal state 416) to a corresponding interface component 108 and registers the interface component 108 to be included in the interface 106. At operation 520, the decision module 213 associates the choice 392 (candidate state 412 or unknown state 414) to a corresponding interface component 108 and registers the interface component 108 to be included in the interface 106. At operation 524, the decision module 213 associates the selected choice 392 (default state 410) to a corresponding interface component 108 and registers the interface component 108 to be included in the interface 106.

At decision operation 522, the decision module 213 identifies whether the decision point 390 is in the idle mode 406 or the learn mode 408 by selecting a choice 392. Specifically, the decision module 213 generates a learning percentage 422, generates a set of choice ranges 424, respectively assigns the choice ranges 424 to the choices 392, generates a choice identifier 426 and selects a choice 392 based on the choice range 424 and the choice identifier 426. Specifically, the choice range 424 that includes the choice identifier 426 corresponds to the selected choice 392. If the choice identifier 426 is included in a choice range 424 that corresponds to a choice 392 in the default state 410 then the decision point 390 is identified to be in the idle mode 406 and a branch is made to operation 524. Otherwise the decision point 390 is identified to be in the learn mode 408 and a branch is made to operation 520.

At decision operation 526, the decision module 213 identifies whether the placement information 226 includes additional decision points 390. If the placement information 226 includes additional decision points 390 a branch is made to operation 528. Otherwise a branch is made to operation 530. At operation 528, the decision module 213 advances to the next decision point 390 in the placement information 226 and branches to decision operation 508. At operation 530, the decision module 213 utilizes the interface components 108 that have been registered to generate the interface 106 and at operation 532 the decision module 213 communicates the interface 106 in a response to the client machine 103. At operation 534, the client machine 103 receives and displays the interface 106.

Figures 8, 9:
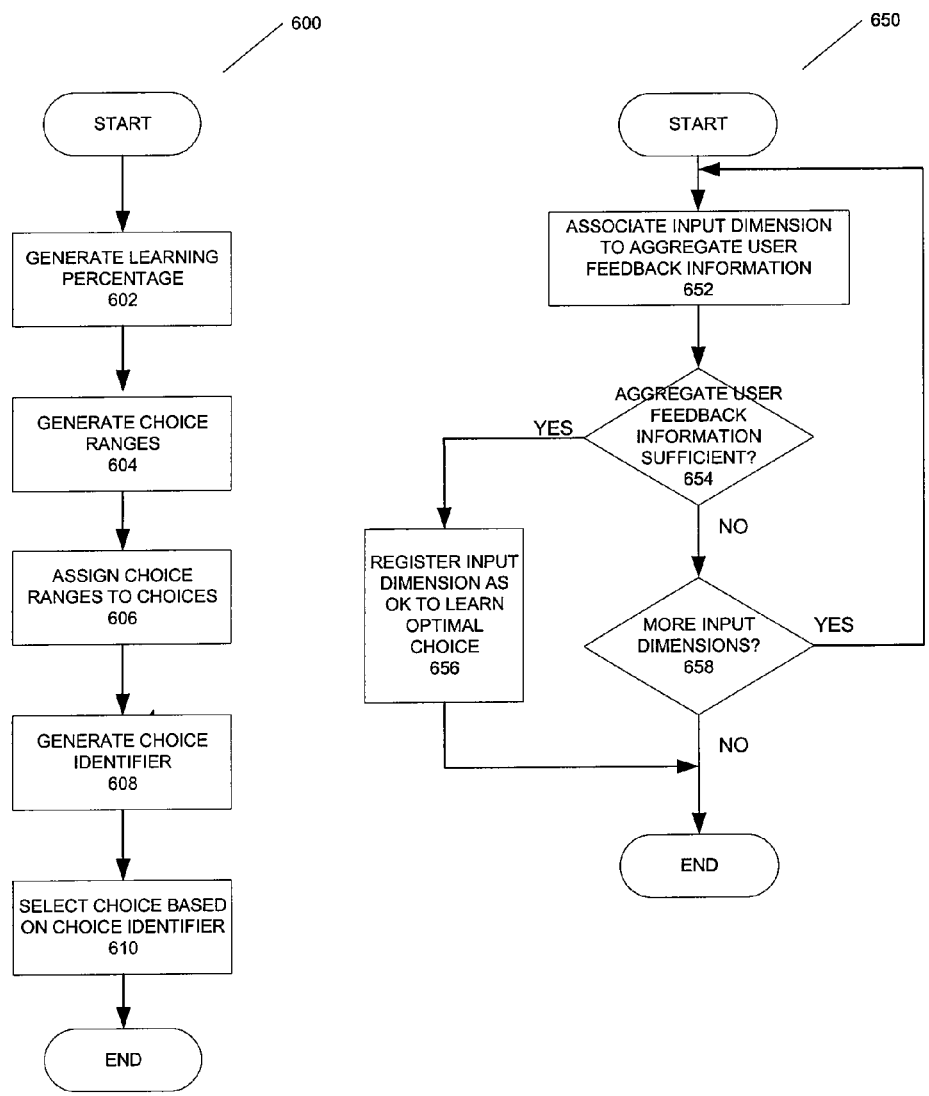
FIG. 8 illustrates a flow chart of a method, according to an embodiment, to learn an optimal choice.
FIG. 9 illustrates a flow chart of a method, according to an embodiment, to rollup data.

FIG. 8 illustrates a flow chart of a method 500, according to an embodiment, to select a choice 392. The method 500 corresponds to decision operations 516, 522 and operations 518, 520, and 524 in FIG. 7 and provides further detail. The method 600 commences at operation 602 with the decision module 213 generating a learning percentage 422. The learning percentage 422 may be generated based four on factors including a coverage factor, a cost of learning factor, a time to learn factor, and a confidence factor, as previously described. Merely for example, decision module 213 may generate a learning percentage 422 of 9%.

At operation 604, the decision module 213 generates choice ranges 424. Specifically, the decision module 213 generates choice ranges 324 based on the learning percentage 422 and the compliment percentage (1—learning percentage 422). The decision module 213 generates choice ranges 324 based on the learning percentage 422 according to the number of choices 392 in the candidate state 412 and the unknown state 414.

The decision module 213 generates choice ranges 324 based on the compliment percentage (1—learning percentage 422) according to the number of choices 392 in the default state 410 (e.g., decision state=warming state 402) or the number of choices 392 in the optimal state 416 (e.g., decision state=running state 404). An example has previously been provided based on a learning percentage of 9%. The number of choice ranges 424 and the respective size of the choice ranges 424 may vary according to the learning percentage 422 and the number of choices 392 in the mentioned states.

At operation 606, the decision module 213 assigns the choice ranges 424 to the appropriate choices 392. Specifically, the decision module 213 assigns the choice ranges 324 that were generated based on the learning percentage 422 according to the choices 392 in the candidate state 412 and the unknown state 414. Further, the decision module 213 assigns the choice ranges 324 that were generated based on the complement percentage according to the choices 392 in the candidate state 412 and the unknown state 414 (1—learning percentage 422) and to the choices 392 in the default state 410 (e.g., decision state=warming state 402) or the number of choices 392 in the optimal state 416 (e.g., decision state=running state 404). An example has previously been provided based on a learning percentage of 9%.

At operation 608, the decision module 213 generates a choice identifier 426. The choice identifier may be a number between 0 and 99. An example has previously been provided.

At operation 610, the decision module 213 utilizes the choice identifier 426 to select a choice 392. Specifically, the decision module 213 identifies the choice 392 by comparing the choice identifier 426 with each of the previously generated choice ranges 424. The decision module 213 selects a choice 392 responsive to identifying choice range 424 that includes the choice identifier 392.

FIG. 9 illustrates a flow chart of a method 650, according to an embodiment, to rollup data. The method 650 corresponds to decision operation 508 and operation 536 in FIG. 7 and provides further detail. At operation 652, the decision module 213 associate an input dimension 250 to aggregated user feedback information 228. Merely for example, the decision module 213 may associate a keyword, "red tractor," to previously collected aggregated user feedback information 228 for the keyword "red tractor."

At decision operation 654, the decision module 213 identifies whether the aggregated feedback information is sufficient. For example, the decision module 213 may generate a sum by adding the impression counts 310 associated with each of the choices 392 at the corresponding the input dimension 250, "red tractor," and comparing the sum against a predetermined threshold. If the sum is equal to or greater than the predetermined threshold then the decision module 213 branches to operation 656. Otherwise the decision module 213 branches to decision operation 658.

At operation 656, the decision module 213 registers the input dimension as being associated with sufficient aggregated user feedback information 228 to learn an optimal choice.

At decision operation 658, the decision module 213 identifies whether more input dimensions 250 are available. Merely for example, the decision module 213 may roll up search information 259 (e.g., keywords) to domain information 258, roll up domain information 258 to buyer segmentation information 254, or roll up buyer segmentation information to site information 251. In the present example, the search information 259 in the form of the keywords, "red tractor," may be rolled up to corresponding domain information 258 in the form a category, "tractor." If more input dimensions 250 are available then a branch is made to operation 652. Otherwise the method ends.

Other Interfaces

The interface 106 has been described above in an embodiment that includes a user interface that may include user interface elements; however, it will be appreciated by those skilled in the art that the interface 106 may also be embodied as a machine interface (e.g., SGML) including machine interface elements, an audio interface including audio interface elements, a kinetic interface including kinetic interface elements, or some other type of interface.

Figure 10:
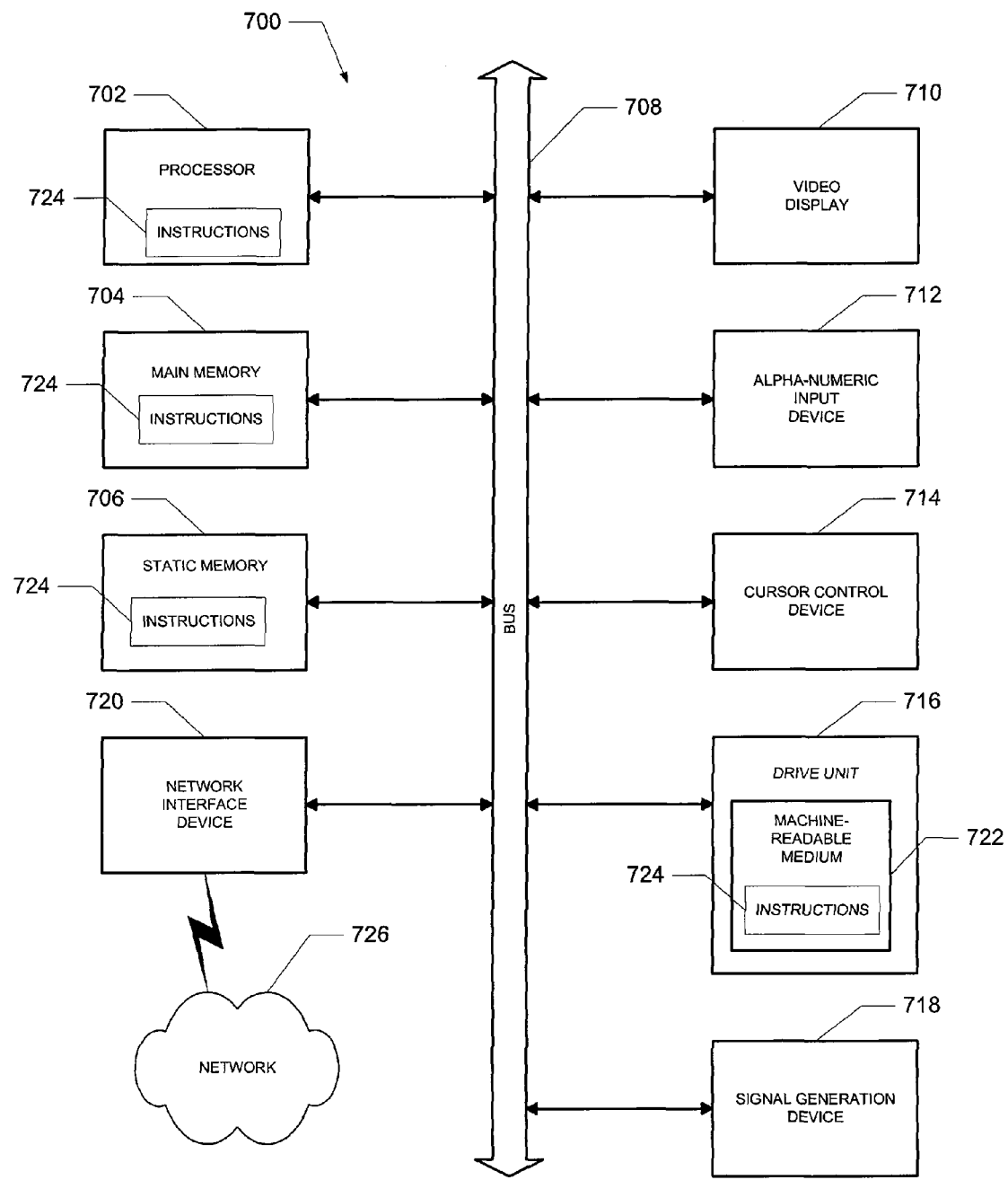
FIG. 10 shows a diagrammatic representation of a machine in the form of a computer system within which a set of instructions, for causing the machine to perform any one or more of the methodologies discussed herein, may be executed, according to an example embodiment.

FIG. 10 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g. a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to learn and deploy an optimal user experience in an online system are disclosed. While the present invention has been described in terms of several example embodiments, those of ordinary skill in the art will recognize that the present invention is not limited to the embodiments described, but may be practiced with modification and alteration within the spirit and scope of the appended claims. The description herein is thus to be regarded as illustrative instead of limiting.

What is claimed is:

1. A method comprising:
    receiving a request over a network from a user, the request including context information;
    identifying a response to the request is to be utilized to learn whether a first interface component included in a first plurality of interface components is an optimal choice for a first decision, the response including an interface, the interface including the optimal choice, the identifying the response to the request is to be utilized is based on the context information; and communicating the response over the network to the user,
    the context information is utilized to identify placement information, the placement information specifies a first plurality of decisions that includes the first decision, the first plurality of decisions are respectively utilized to identify a second plurality of interface components to be stored in the interface, the second plurality of interface components includes the first plurality of interface components,
    the identifying further comprising generating a ratio based on a first impression count that measures a level of exposure of a third plurality of interface components that have been previously included in a plurality of responses that have been communicated responsive to receiving a first plurality of requests that include the context information.

2. The method of claim 1, wherein the second plurality of interface components comprises a second interface component that is designated an optimal choice of an interface component from a fourth plurality of interface components, wherein the second interface component is designated the optimal choice based on a score that measures a likelihood of receiving revenue by including the second interface component in the interface.

3. The method of claim 1, wherein the identifying the response to the request is to be utilized to learn includes orthogonally evaluating a plurality of decisions that are respectively associated with the second plurality of interface components.

4. The method of claim 1, further comprising selecting the first interface component based on a user identifier that identifies the user.

5. The method of claim 1, wherein the identifying the response is to be utilized to learn comprises evaluating a plurality of decisions that are respectively utilized to select the second plurality of interface components that are respectively included in the interface.

6. The method of claim 1, wherein the context information is associated with a predetermined condition that is utilized to identify a second interface component that is included in the interface.

7. The method of claim 1, further comprising generating the interface that is included in the response, wherein the first interface component includes an interface module that is selected from a plurality of interface modules, wherein the plurality of interface modules include a first interface module, a second interface module and a third interface module that are respectively associated with a first score, a second score, and a third score that respectively measure a likelihood of receiving revenue.

8. The method of claim 7, further comprising seeding a fourth interface module to identify whether the fourth interface module is associated with a fourth score that measures a likelihood of receiving revenue that is greater than the first score, the second score and the third score.

9. The method of claim 1, wherein the context information comprises a keyword and further comprising:
    associating the keyword to a first set of aggregated user feedback information;
    identifying the first aggregated user feedback information is insufficient to learn the optimal choice;
    mapping the keyword to a category;
    associating the category to a second set of aggregated user feedback information; and
    utilizing the second set of aggregated user feedback information to learn the optimal choice.

10. A system comprising:
    a receiving module to receive a request over a network from a user, the request includes context information; and
    a decision module to identify a response to the request is to be utilized to learn whether a first interface component included in a first plurality of interface components is an optimal choice for a first decision, the response includes an interface, the interface includes the first interface component, the decision module to identify the response to the request is to be utilized is based on the context information, the decision module to communicate the response over the network to the user,
    the context information is utilized to identify placement information, wherein the placement information specifies a first plurality of decisions that includes the first decision, the first plurality of decisions are respectively utilized to identify a second plurality of interface components to be stored in the interface, wherein the second plurality of interface components includes the first plurality of interface components,
    the decision module is to further generate a ratio based on a first impression count that measures a level of exposure of a third plurality of interface components that have been previously included in a plurality of responses that have been communicated responsive to receiving a first plurality of requests that include the context information.

11. The system of claim 10, wherein the generating the ratio is further based on a second impression count that is associated with the first decision, wherein the second impression count measures a level of exposure of the first plurality of interface components that have been previously included in a plurality of responses that have been communicated responsive to receiving a second plurality of requests that are included in the first plurality of requests.

12. The system of claim 10 wherein the decision module is to generate the ratio based on a cost of learning associated with the first decision, an amount of time required to identify the optimal choice for the first decision, and a measure of confidence that revenue attributed to the first decision exceeds a predetermined threshold.

13. The system of claim 10, wherein the decision module is to select the first interface component based on a user identifier that identifies the user.

14. The system of claim 10, wherein the decision module is to evaluate a plurality of decisions that are respectively utilized to select the second plurality of interface components that are respectively included in the interface.

15. The system of claim 10, wherein the context information is associated with a predetermined condition that is utilized to identify a second interface component that is included in the interface.

16. The system of claim 10, wherein the decision module is to generate the interface that is included in the response, wherein the first interface component comprises an interface module that is selected from a plurality of interface modules, wherein the plurality of interface modules comprise a first interface module, a second interface module and a third interface module that are respectively associated with a first score, a second score, and a third score that respectively measure a likelihood of receiving revenue.

17. The system of claim 16, wherein the decision module is to seed a fourth interface module to identify whether the fourth interface module is associated with a fourth score that measures a likelihood of receiving revenue that is greater than the first score, the second score and the third score.

18. The system of claim 10, wherein the context information comprises a keyword and wherein the decision module is to:
associate the keyword to a first set of aggregated user feedback information;
identify the first aggregated user feedback information is insufficient to learn the optimal choice;
map the keyword to a category;
associate the category to a second set of aggregated user feedback information; and
utilize the second set of aggregated user feedback information to learn the optimal choice.

19. A non-transitory machine-readable medium storing instructions that, when executed by a machine, cause the machine to
receive a request over a network from a user, the request includes context information;
identify a response to the request is to be utilized to learn whether a first interface component included in a first plurality of interface components is an optimal choice for a first decision, the response includes an interface, the interface comprising the optimal choice, the identifying the response to the request is to be utilized is based on the context information; and
communicate the response over the network to the user,
the context information is utilized to identify placement information, the placement information specifies a first plurality of decisions that includes the first decision, the first plurality of decisions are respectively utilized to identify a second plurality of interface components to be stored in the interface, the second plurality of interface components includes the first plurality of interface components,
the identification of the response by the machine further includes the machine to generate a ratio based on a first impression count that measures a level of exposure of a third plurality of interface components that have been previously included in a plurality of responses that have been communicated responsive to a receipt of a first plurality of requests that include the context information.

20. A system to learn an optimal user experience, the system comprising:
a receiving module to receive a request over a network from a user, the request comprising context information; and
a first means for identifying a response to the request is to be utilized to learn whether a first interface component included in a first plurality of interface components is an optimal choice for a first decision, the response comprising an interface, the interface including the optimal choice, the first means to identify the response to the request is to be utilized based on the context information, the first means to communicate the response over the network to the user,
the context information is utilized to identify placement information, the placement information specifies a first plurality of decisions that includes the first decision, the first plurality of decisions are respectively utilized to identify a second plurality of interface components to be stored in the interface, the second plurality of interface components includes the first plurality of interface components,
the first means is further to generate a ratio based on a first impression count that measures a level of exposure of a third plurality of interface components that have been previously included in a plurality of responses that have been communicated responsive to receipt of a first plurality of requests that include the context information.

21. The system of claim 20, wherein the decision module is to seed a fourth interface module to identify whether the fourth interface module is associated with a fourth score that measures a likelihood of receiving revenue that is greater that the first score, the second score and the third score.

22. The system of claim 12, wherein the context information comprises a keyword and wherein the decision module is to:
associate the keyword to a first set of aggregated user feedback information;
identify the first aggregated user feedback information is insufficient to learn the optimal choice;
map the keyword to a category;
associate the category to a second set of aggregated user feedback information; and
utilize the second set of aggregated user feedback information to learn the optimal choice.

23. A machine-readable medium storing instructions that, when executed by a machine, cause the machine to:
receive a request over a network from a user, the request including context information;

identify a response to the request is to be utilized to learn whether a first interface component included in a first plurality of interface components is an optimal choice for a first decision, the response includes an interface, the interface comprising comprising the optimal choice, the identifying the response to the request is to be utilized is based on the context information; and communicate the response over the network to the user.

24. A system to learn an optimal user experience, the system comprising:

a receiving module to receive a request over a network from a user, the request comprising context information; and a first means to identify a response to the request is to be utilized to learn whether a first interface component included in a first plurality of interface components is an optimal choice for a first decision, the response comprising an interface, the interface including the optimal choice, the first means to identify the response to the request is to be utilized based on the context information, the first means to communicate the response over the network to the user.

* * * * *